United States Patent
Beeler et al.

(10) Patent No.: US 9,893,927 B2
(45) Date of Patent: *Feb. 13, 2018

(54) EMBEDDED META-CARRIER WITH SPREAD SPECTRUM VIA OVERLAID CARRIERS

(75) Inventors: Michael Beeler, Jefferson, MD (US); Frederick Morris, Gaithersburg, MD (US); Jeffery Harig, Mesa, AZ (US); Cris Mamaril, Mesa, AZ (US)

(73) Assignee: Cometch EF Data Corp., Tempe, AZ (US)

(*) Notice: Subject to any disclaimer, the term of this patent is extended or adjusted under 35 U.S.C. 154(b) by 1027 days.

This patent is subject to a terminal disclaimer.

(21) Appl. No.: 13/024,402

(22) Filed: Feb. 10, 2011

(65) Prior Publication Data
US 2011/0249706 A1    Oct. 13, 2011

Related U.S. Application Data

(60) Provisional application No. 61/322,257, filed on Apr. 8, 2010.

(51) Int. Cl.
| H04B 1/00 | (2006.01) |
| H04L 27/34 | (2006.01) |
| H04B 1/707 | (2011.01) |

(52) U.S. Cl.
CPC ......... *H04L 27/3488* (2013.01); *H04B 1/707* (2013.01)

(58) Field of Classification Search
None
See application file for complete search history.

(56) References Cited

U.S. PATENT DOCUMENTS

| 5,048,015 | A | * | 9/1991 | Zilberfarb | 370/312 |
| 5,245,612 | A | | 9/1993 | Kachi et al. | |
| 5,537,397 | A | | 7/1996 | Abramson | |
| 5,748,677 | A | * | 5/1998 | Kumar | 375/285 |
| 5,937,000 | A | * | 8/1999 | Lee et al. | 375/141 |
| 6,147,640 | A | | 11/2000 | Wachs | |
| 6,985,512 | B1 | | 1/2006 | McDermott et al. | |
| 7,227,884 | B2 | | 6/2007 | McDermott | |
| 7,433,391 | B2 | | 10/2008 | Stafford et al. | |
| 7,596,170 | B2 | | 9/2009 | McDermott et al. | |
| 2001/0033674 | A1 | * | 10/2001 | Chen et al. | 382/100 |
| 2002/0122566 | A1 | * | 9/2002 | Keating et al. | 382/100 |
| 2002/0146995 | A1 | * | 10/2002 | McLain et al. | 455/296 |
| 2002/0169875 | A1 | * | 11/2002 | Furui | G06F 17/30864 709/225 |
| 2003/0073435 | A1 | * | 4/2003 | Thompson et al. | 455/428 |
| 2003/0224723 | A1 | * | 12/2003 | Sun et al. | 455/12.1 |
| 2004/0042635 | A1 | * | 3/2004 | Epstein et al. | 382/100 |
| 2005/0085186 | A1 | * | 4/2005 | Sandrin | 455/12.1 |

(Continued)

*Primary Examiner* — Shuwang Liu
*Assistant Examiner* — Gina McKie
(74) *Attorney, Agent, or Firm* — Booth Udall Fuller, PLC

(57) ABSTRACT

A communication method for embedding a meta-carrier under an original carrier signal with reduced or minimal original carrier signal degradation, the method comprising transmitting an original carrier signal and transmitting a meta-carrier signal separate from the original carrier signal, wherein the meta-carrier signal contains information about an original carrier signal, is extractable under an interfered condition, and is transmitted such that the meta-carrier signal occupies at least a portion of a bandwidth of the original carrier signal.

46 Claims, 10 Drawing Sheets

(56) References Cited

U.S. PATENT DOCUMENTS

| | | |
|---|---|---|
| 2006/0274865 A1 | 12/2006 | Arunachalam |
| 2007/0274523 A1* | 11/2007 | Rhoads ......................... 380/252 |
| 2008/0151832 A1 | 6/2008 | Iwasaki |
| 2010/0195561 A1* | 8/2010 | Yamaguchi et al. .......... 370/315 |
| 2011/0135013 A1* | 6/2011 | Wegener ....................... 375/241 |

* cited by examiner

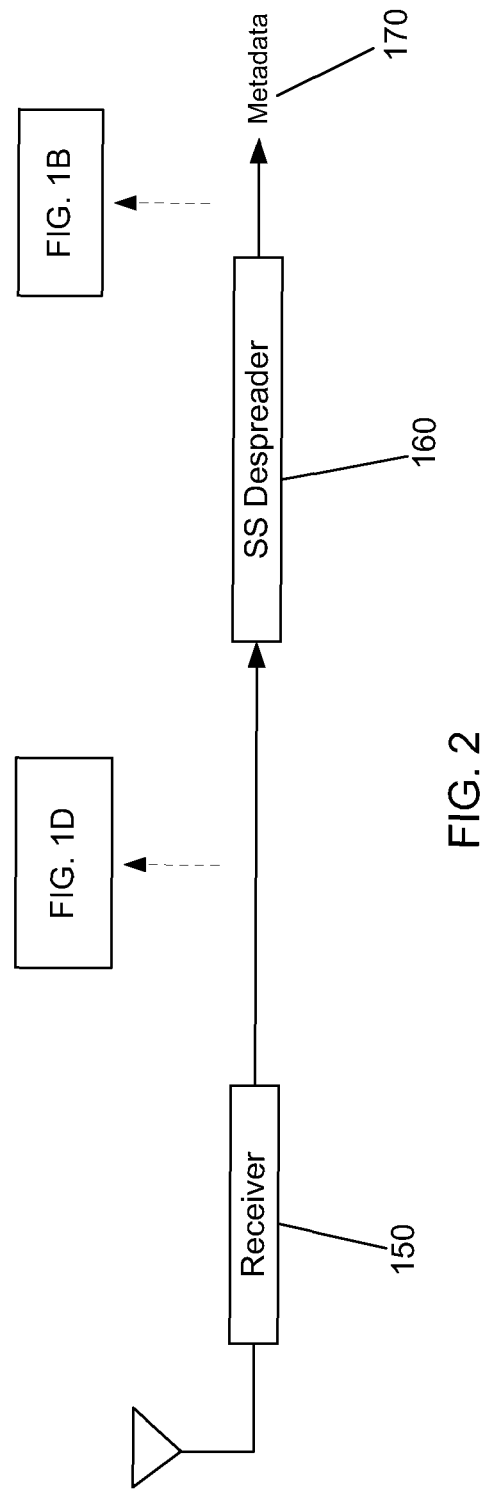

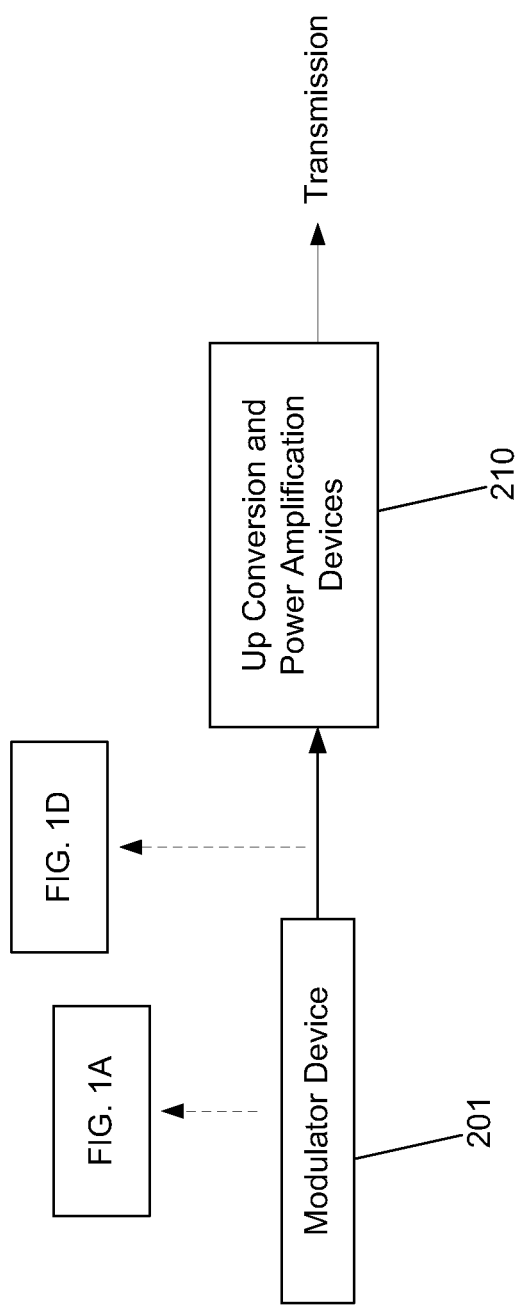

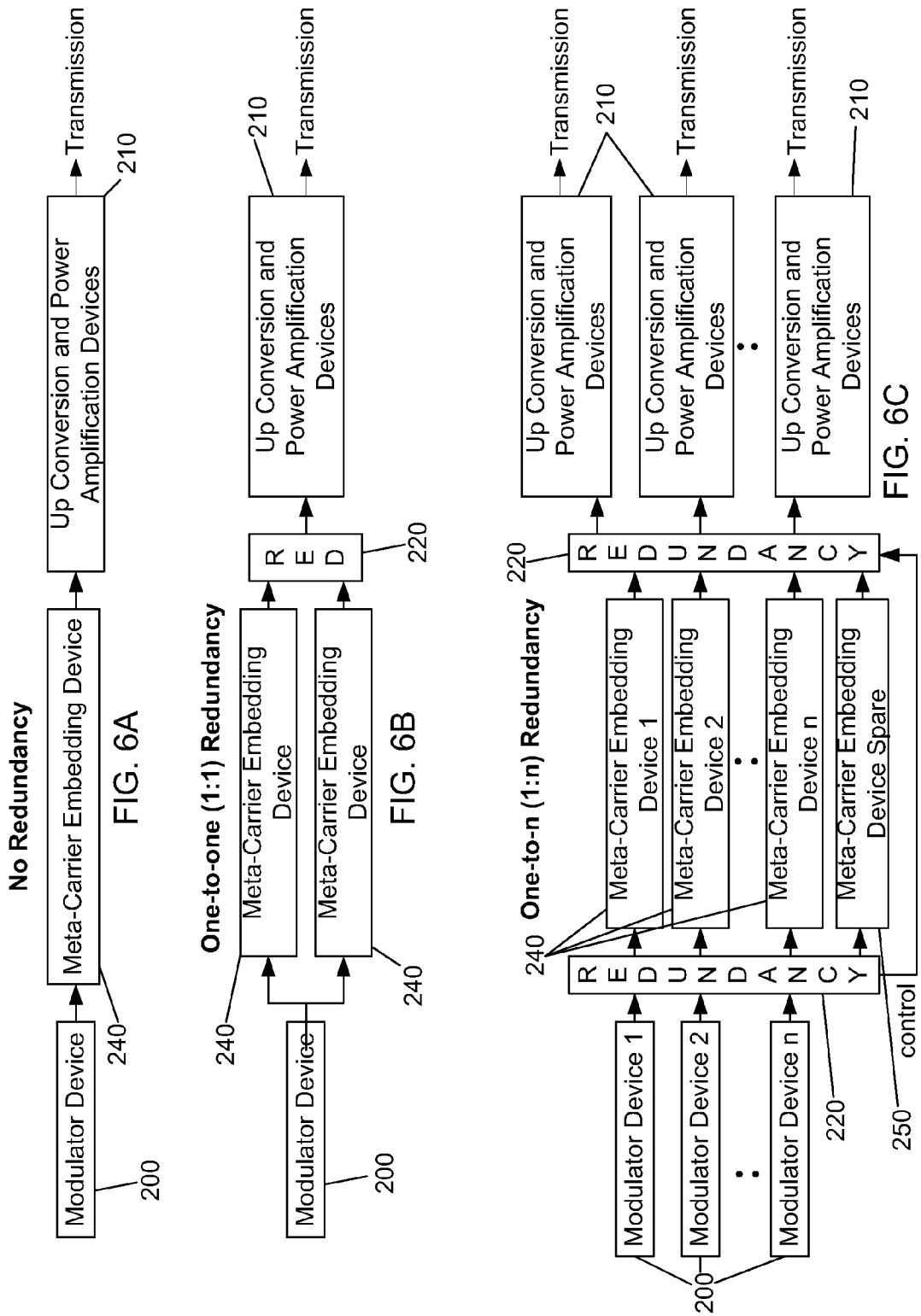

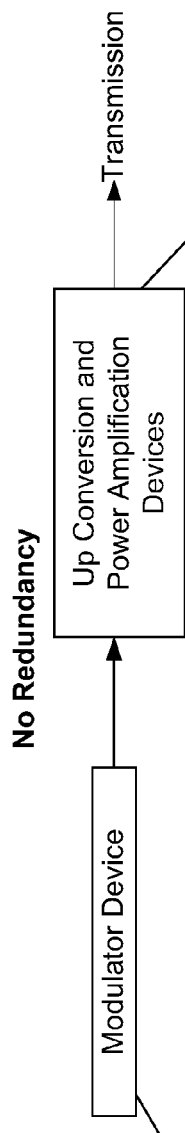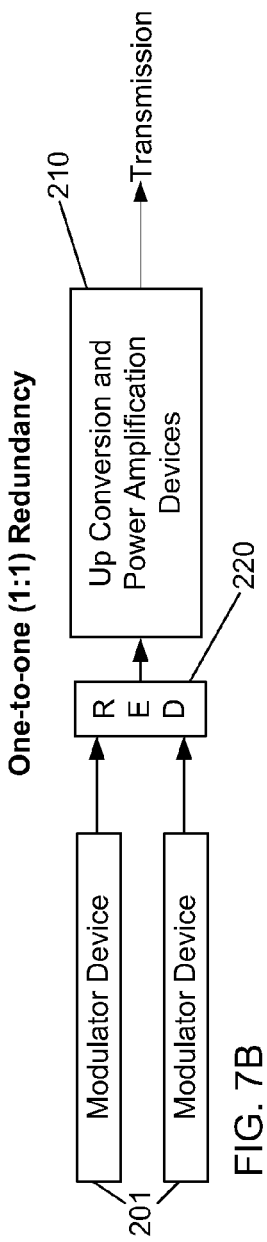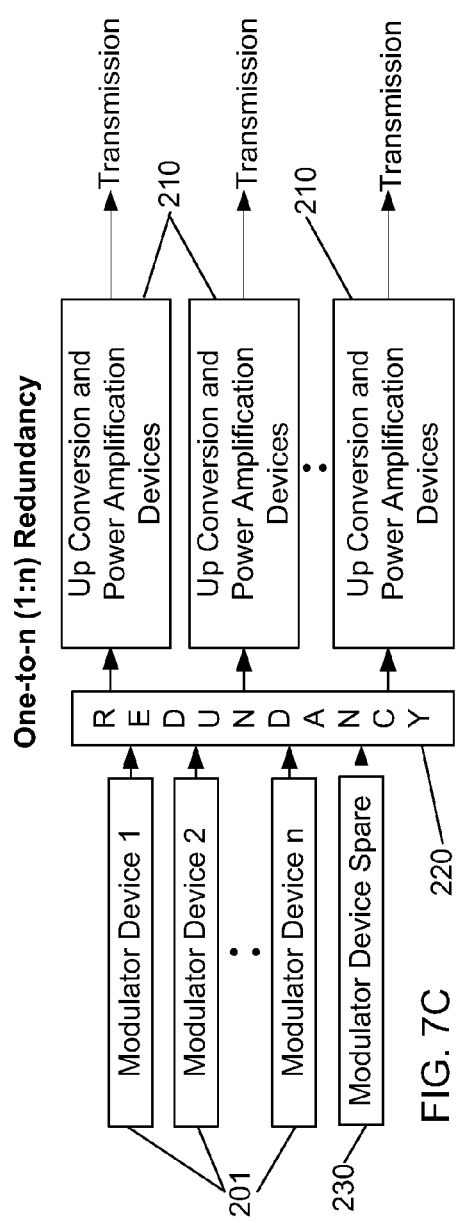

EMBEDDED META-CARRIER WITH SPREAD SPECTRUM VIA OVERLAID CARRIERS

CROSS REFERENCE TO RELATED APPLICATIONS

This document claims the benefit of the filing date of U.S. Provisional Patent Application No. 61/322,257, entitled "Embedded Meta-Carrier with Spread Spectrum via Overlaid Carriers" to Michael Beeler et al., which was filed on Apr. 8, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of electromagnetic (EM) transmission, a recurring problem that continues to challenge the industry is rogue or improperly configured transmitted carriers also known as interferers. The interfering carrier may be caused by failed equipment that results in the transmission equipment transmitting or sweeping the wrong spectral location or locations. Under these circumstances, the carrier is known as a "rogue carrier." A second type of interferer is known as an improperly configured carrier and is primarily due to human error this includes both improper carrier characteristics and antenna pointing errors. In many situations, the rogue or improperly configured carrier results in service disruption due to interference with a carrier assigned to operate in the same occupied bandwidth.

A system of providing identification and location of a rogue carrier or improperly configured carrier includes adequate information for identifying and locating the source of the carriers. This information is referred to as meta-data. A meta-carrier is a method for the transmission of meta-data.

SUMMARY

Implementations of a communication method for embedding a meta-carrier under an original carrier signal with reduced or minimal original carrier signal degradation may comprise transmitting an original carrier signal and transmitting a meta-carrier signal separate from the original carrier signal, wherein the meta-carrier signal is extractable under an interfered condition, contains information about an original carrier signal, and is transmitted such that the meta-carrier signal occupies at least a portion of a bandwidth of the original carrier signal.

Particular implementations may comprise one or more of the following features. The original carrier signal may comprise information as to the identity of the original carrier signal. The original carrier signal may not have any information as to an identity of the original carrier signal. The modulation format may be one of binary phase shift keying (BPSK), differential BPSK, phase shift keying (PSK), quadrature amplitude modulation (QAM) and M-ary modulation. Methods may further comprise encoding meta-data that contains information about the original carrier signal using an encoder, modulating the encoded meta-data using a modulator, spreading, using a spreader, the modulated meta-data such that a spread meta-carrier signal results, combining, by a meta-carrier embedding device, the spread meta-carrier signal with the original carrier signal to create a composite carrier signal such that the spread meta-carrier signal occupies at least a portion of a bandwidth of the original carrier signal. Methods may further comprise receiving the composite carrier signal by a receiving device, despreading, using a despreader, the spread meta-carrier signal, demodulating, using a demodulator, the despread meta-carrier signal, and decoding, using a decoder, the demodulated meta-data signal. Methods may further comprise scanning, by a scanning device, a spectrum of the received composite carrier signal to automatically detect the meta-carrier signal. Methods may further comprise remodulating, using a regenerative receiver on the original carrier, a representation of the original carrier, and reducing signal power of the original carrier signal contained in the composite carrier signal using cancellation prior to despreading the spread meta-carrier signal. A realized processing gain may comprise the ratio of the bandwidth of the spread meta-carrier signal to the bandwidth of the meta-carrier signal prior to spreading. Combining may further comprise externally embedding the spread meta-carrier signal containing the meta-data within the original carrier signal downstream of the modulator. External embedding may further comprise embedding at least one spread meta-carrier signal within more than one of a plurality of original carrier signals. Methods may further comprise combining, by an embedding device, the original carrier signal and the spread meta-carrier signal, embedding the spread meta-carrier signal into the original carrier signal using an embedding device such that the composite carrier signal results, and creating a redundancy of the composite carrier signal using a redundancy controller. Redundancy may be a one-to one redundancy. Methods may further comprise receiving by a redundancy controller two or more output signals from two or more modulators, and embedding, by one or more meta-carrier embedding devices, the post-modulation meta-carrier signal within the original carrier signal. The redundancy controller may provide a one-to-n redundancy where n equals the number of modulating devices providing output signals that are monitored by the redundancy controller. The redundancy controller may provides an m-to-n redundancy where n equals the number of modulating devices providing output signals that are monitored by the redundancy controller and m equals the number of spare meta-carrier embedding devices that provide backup to n modulating devices. Combining may further comprise directly embedding the meta-carrier signal containing meta-data during the modulation process within a modulator. Methods may further comprise accepting one or more composite carrier output signals from two or more modulating devices, the composite carrier output signals by the two or more modulating devices, and transmitting each output signal to a redundancy controller. The redundancy controller may provide a one-to-one redundancy. The redundancy controller may provide a one-to-n redundancy by monitoring the output signals of n modulating devices and a spare backup modulating device where n equals the number of modulating devices providing output signals that are monitored by the redundancy controller. The redundancy controller may provide an m-to-n redundancy where n equals the number of modulating devices providing output signals that are monitored by the redundancy controller and m equals the number of spare modulating devices that provide backup to n modulating devices. Methods may further comprise analyzing the composite carrier signal, and extracting a carrier center frequency and carrier bandwidth. Methods may further comprise applying an $n^{th}$ order non-linearity to the original carrier signal prior to analyzing the original carrier signal.

Implementations for a communication system for embedding a meta-carrier under an original carrier signal with reduced or minimal original carrier signal degradation may comprise at least one transmitting device that transmits an original carrier signal and a meta-carrier signal, separate from the original carrier signal, the meta-carrier signal being extractable under an interfered condition and containing information about the original carrier signal, wherein the meta-carrier signal occupies at least a portion of a bandwidth of the original carrier signal.

Particular implementations may comprise one or more of the following features. The original carrier signal may further comprise information as to the identity of the original carrier signal. The original carrier signal may not have any information as to the identity of the original carrier signal. Systems may further comprise an encoder that encodes meta-data containing information about the original carrier signal and routes the encoded meta-data, a modulator that modulates the spread meta-carrier signal using a modulation format, a spreader that receives the encoded meta-data from the encoder, spreads the encoded meta-data such that a spread meta-carrier signal results, and routes the spread meta-carrier signal, and a meta-carrier embedding device that receives the modulated spread meta-carrier signal, combines the modulated spread meta-carrier signal with an original carrier signal to create a composite carrier signal. Systems may further comprise a receiving device that receives the composite carrier signal from the transmitting device and routes the composite carrier signal, a despreader that receives the spread meta-carrier signal and extracts the meta data by despreading the spread meta-carrier signal, a demodulator that receives the de-spread meta-carrier signal from the separating device, demodulates the de-spread meta-carrier signal, and routes demodulated meta-carrier signal, and a decoder that receives the demodulated meta-carrier signal from the demodulator and decodes the demodulated meta-data signal. Systems may further comprise a scanning device that scans a spectrum of the received composite carrier signal to automatically detect the meta-carrier signal. Systems may further comprise a regenerative receiver that remodulates a representation of the original carrier signal, and a cancellation device that reduces signal power of the original carrier signal contained in the composite carrier signal prior to dispreading the spread meta-carrier signal. A realized processing gain may comprise the ratio of the bandwidth of the spread meta-carrier signal to the bandwidth of a meta-carrier signal prior to spreading. The modulator may directly embed the carrier signal containing meta-data into the original carrier signal during the modulation process. Systems may further comprise a redundancy controller that accepts one or more composite carrier output signals from two or more modulating devices, the composite carrier output signals comprising one or more spread meta-carrier signals embedded within one or more original carrier signals by the two or more modulating devices wherein the redundancy controller further routes the output signals to one or more devices for up conversion and power amplification. The redundancy controller may provide a one-to one redundancy. The redundancy controller may provide a one-to-n redundancy by monitoring the output signals of n modulating devices and a spare backup modulating device where n equals the number of modulating devices providing output signals that are monitored by the redundancy controller. The redundancy controller may provide an m-to-n redundancy where n equals the number of modulating devices providing output signals that are monitored by the redundancy controller and m equals the number of spare modulating devices that provide backup to n modulating devices. Systems may further comprise a digital signal processor that analyzes the composite carrier signal and extracts a carrier center frequency and carrier bandwidth. Systems may further comprise an $n^{th}$ order linearity that is applied to the original carrier signal prior to analyzing the original carrier signal. Systems may further comprise a redundancy controller that provides the meta-data to the modulator. The meta-carrier embedding device may combine the spread meta-carrier signal with the original carrier signal downstream of the modulator. The meta-carrier embedding device may further embed at least one spread meta-carrier signal within more than one of a plurality of original carrier signals. Systems may further comprise an embedding device that receives the original carrier signal and the spread meta-carrier signal and embeds the spread meta-carrier signal into the original carrier signal such that the composite carrier signal results, and a redundancy controller that creates a redundancy of the composite carrier. The redundancy may comprise a one-to one redundancy. Systems may further comprise a redundancy controller that receives two or more output signals from two or more modulators, and one or more meta-carrier embedding devices that receive the output signals from the redundancy controller and embed the post-modulation meta-carrier signal within the original carrier signal. The redundancy controller may provide a one-to-n redundancy where n equals the number of modulating devices providing output signals that are monitored by the redundancy controller. The redundancy controller may provide an m-to-n redundancy where n equals the number of modulating devices providing output signals that are monitored by the redundancy controller and m equals the number of spare meta-carrier embedding devices that provide backup to n modulating devices. The modulation format is one of binary phase shift keying (BPSK), differential BPSK, phase shift keying (PSK), quadrature amplitude modulation (QAM), and M-ary modulation.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 2 is a block diagram of a receiving device for demodulating and decoding the meta-carrier without cancellation.

FIG. 5 is a block diagram of an internal direct meta-carrier insertion configuration.

FIGS. 6A-D are a block diagrams of redundancy configurations for inline embedding of the meta-carrier.

FIGS. 7A-D are a block diagrams of redundancy configurations for direct embedding of the meta-carrier.

DESCRIPTION

Figure 1A:
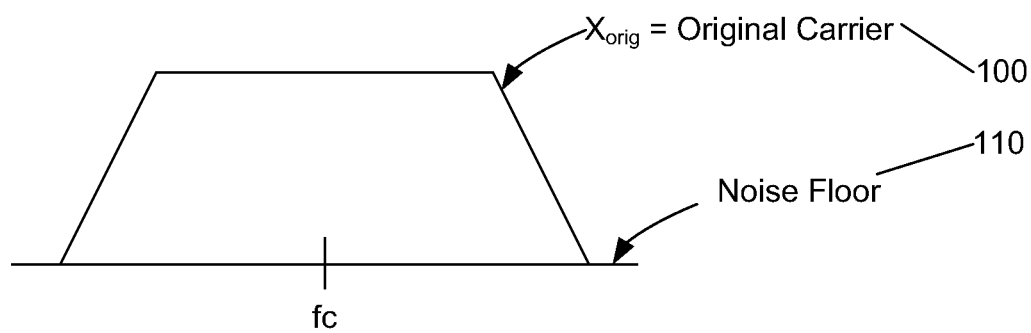
FIGS. 1A-D depict representations of an embedded meta-carrier waveform.
Figure 1B:
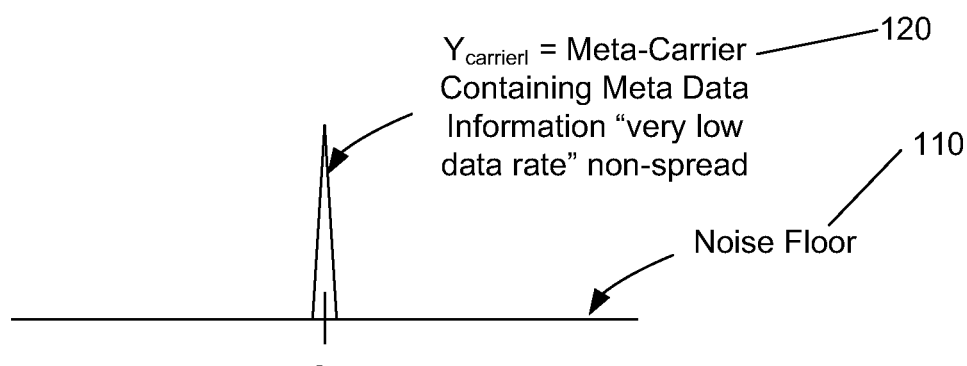
Figure 1C:
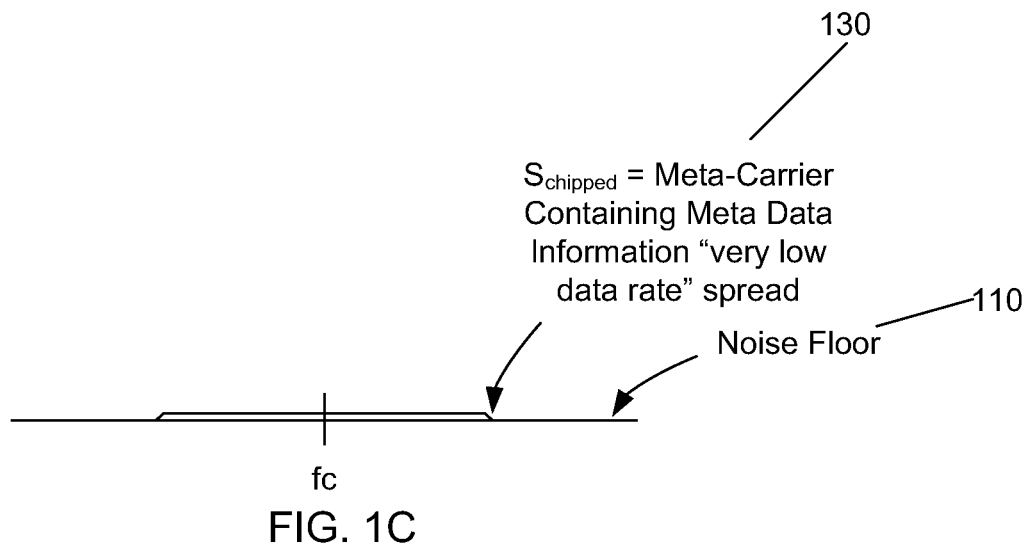
Figure 1D:
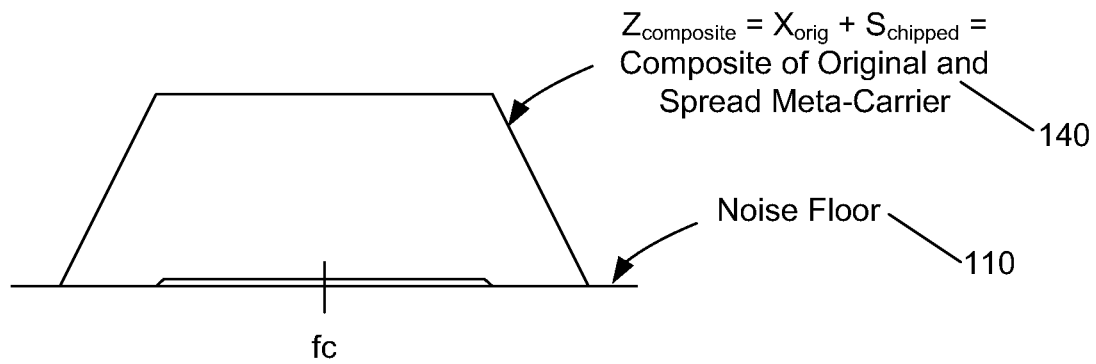

This disclosure, its aspects and implementations, are not limited to the specific components, frequency examples, redundancy configurations or methods disclosed herein. Many additional components and assembly procedures known in the art consistent with embedding meta-data techniques are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to, but is not limited to, improved embedding of the metadata information techniques. As an alternative embodiment, the meta-carrier information could be replaced with telemetry, coordinates (latitude and longitude manually entered or provided by a Global Positioning System (GPS) automatically), user data, etc. Particular implementations described herein are and may use, but are not limited to, field-programmable gate arrays (FPGA), digital signal processors, or microprocessors.

Particular implementations assume that the initial configuration of the transmitting device may be known and properly configured, but as described in this document the metadata may be extracted from the carrier dynamically through analysis or statically entered by a user.

Particular implementations of meta-carrier systems disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as cellular phone network or terrestrial microwave or broadcast systems without undue experimentation.

The methods described may provide the ability for someone skilled in the art, e.g., a satellite operator, interference monitoring service, federal or state agency, private or commercial operator, to rapidly identify the source of the interfering carrier using the methods described.

Particular implementations operate on either a modulated carrier prior to up conversion and power amplification or at baseband. The embedding of the meta-carrier information may operate in inline (FIG. 4) or direct (FIG. 5), so the composite (original carrier and the meta-carrier) transmitted signal may employ digital signal processing (DSP) techniques such as adaptive filtering or equalization, which can be easily implemented in FPGA, digital signal processors, Application Specific Integrated Circuit (ASIC) or microprocessors using conventional implementation methods known in the art with knowledge of this disclosure.

One of ordinary skill in the art would recognize that the disclosed systems and methods may be applicable for combining a single meta-carrier signal with a single original carrier signal but also may be applicable for combining at least one meta-carrier signal with multiple original carrier signals.

Aspects of this disclosure relate to a method and system for creating a composite signal from the original desired carrier and the meta-carrier for transmission, and reception, despreading of the meta-carrier signal, demodulation, decoding and processing of the meta-carrier signal and the original desired carrier signal.

In another aspect, this disclosure relates to a method for providing a standalone or redundant product where multiple redundant configurations may exist for ensuring reliable operation. Implementations of the method may be accomplished with or without regard to redundancy as shown in FIGS. 6A-7D. The redundant configurations are shown as non-limiting examples of the methods and systems utilizing these implementations.

This disclosure relates to systems and methods for embedding information regarding an electromagnetic transmission's origin and offers the ability to provide information about a carrier's source to include information about the transmission equipment (e.g. manufacturer, model, serial number, device configuration, etc.), location (e.g. address, latitude and/or longitude, etc.), contact information, type of carrier, symbol rate, transmitter point of contact, and/or target or proposed destination. The meta-carrier information to be transmitted is finite and requires minimal bandwidth for delivery. As a result, the data rate required for transmission is on the order of thousands, hundreds, or tens of bits per second or less, thus allowing for tremendous spreading of the waveform. The disclosed systems and methods may be employed for an electromagnetic emitting device, such as optical or Radio Frequency (RF) transmission equipment for point-to-point, point-to-multipoint and/or multipoint-to-multipoint for embedded information.

One of ordinary skill in the art would recognize that meta-data is an adequate collection of information to identify and locate the source of a localized rogue or improperly configured carrier. This information may be manually supplied to the embedding device or may be a combination of manual and machine supplied information. For example, the set of meta-data may include any set, superset (items not defined) or subset of information such as device manufacturer, device configuration, carrier frequency, symbol rate, transmission location, target destination, transmission point of contact, satellite transponder target information, satellite operator information, or any other potentially relevant information.

In one particular implementation, a method for embedding information about a carrier combines the original carrier with the desired information, regardless of the modulation type, rate or forward error correction with a very low-data rate carrier (containing information about the desired carrier known as the metadata). The low data rate carrier is spread with a direct sequence spread spectrum (DSSS) waveform and is known as the meta-carrier. An example of a process of spreading the very low-data rate carrier and combining with the original carrier are shown in FIGS. 1A-1D. Although the implementation described in this non-limiting example is given in relation to a DSSS waveform, other techniques using other waveforms, such as by non-limiting example frequency hopping spread spectrum (FHSS) waveforms may be used. One unique aspect of this disclosure relates to spreading the meta-carrier by a significantly larger bandwidth spreading factor, of many orders of magnitude, many times the original meta-carrier's data rate, resulting in a miniscule amount of noise being added to the original carrier's spectrum. Additionally, the act of spreading the meta-carrier information by many orders of magnitude (hundreds, thousands or even millions of times) results in tremendous processing gain that can be realized to extract the carrier meta-data from the received combined original and meta-carrier for decoding the original carrier information and meta-data information from the composite carrier. The combined carrier demonstrates an embodiment in an operational configuration.

A method for embedding information may be accomplished at a relay point such as a terrestrial repeater, airborne or a satellite relay. Though the original carrier(s) may not have originated at the relay location, the relay point may be recognized as a collection point for carriers, combined, power amplified and re-transmitted. Metadata about the relay may be embedded into the spectrum with the original carrier(s) as described in FIGS. 1A-D. Information about the relay may be accomplished by combining the original carrier(s) with the meta-carrier information, regardless of the modulation type, rate or forward error correction with a very low-data rate carrier which contains metadata, or information, about the desired carrier. The original carrier signal may contain information regarding the identity of the original carrier signal or may be lacking such information. Another unique aspect of particular implementations is that the embedded meta-carrier may be used as a beacon to identify the source of the relay.

In some aspects, the combining of the original carrier(s) with the meta-carrier information may be performed either within the modulator or external to the modulator.

In the in which the combining occurs external to the modulator, an external embedding device may determine the original carrier center frequency and bandwidth. The external device can then determine the optimal meta-carrier spreading factor to be applied to the meta-data. The external device can then spectrally combine the original carrier and the meta-carrier to create a composite carrier for post modulation transmission.

A non-limiting digital signal processing technique that analyzes the original carrier signal using a Discrete Fast Fourier transform (DFFT) and extracts a center frequency and carrier bandwidth may also be used within such related systems. An nth order non-linearity may be also be applied to the original carrier signal prior to analyzing the original carrier signal using a DFFT.

In the case in which the combining occurs within the modulator, a single device may provide both the original carrier FEC encoding and modulation and the meta-data FEC encoding, modulation and spreading in order to combine and output a composite carrier.

In some implementations, a receiving device having the processing capacity to separate the original carrier from the meta-carrier may also be used. Such a device may also have the capacity to process the meta-carrier and re-generate the meta-data for output. Additionally, the receiving device may also have the capacity to either process the original carrier or forward it to a device for subsequent processing.

It is also possible for a receiving device to de-spread, demodulate and FEC decode the meta-carrier to produce the desired meta-data for output. In some implementations, however, the receiving device may be a device that only extracts the meta-data information.

Additionally, it is also possible for the receiving device to provide both the separation and processing of the meta-carrier and original carrier to produce both the meta-data and the user data.

It may also be advantageous to implement a scanning device that automatically scans the received spectrum of composite carriers to detect the presence of one or more meta-carrier signals.

FIGS. 1A-1D illustrate an implementation of a communications transmission carrier wherein the output has been modulated to IF or RF. In this diagram, the output of the modulating equipment contains a single modulated carrier $x_{orig}(t)=A_I \cos(\omega_c t)+A_Q \sin(\omega_c t)$ as represented as $X_{orig}$ 100 that may or may not contain information about the origin, configuration, etc. of the source transmission, or any embedded information. In the particular implementation illustrated in FIGS. 1A-1D, the carrier information is shown as a low-rate (non-spread) carrier, $Y_{carrierI}(t)=B_I \cos(\omega_c t+\omega_c)+B_Q \sin(\omega_c t+\omega_c)$, as represented as $Y_{carrierI}$ 120, prior to being spread. One of ordinary skill in the art will realize that any appropriate modulation format may be used, such as, for example, Binary Phase Shift Keying (BPSK), differential BPSK, phase shift keying (PSK), quadrature amplitude modulation (QAM) and M-ary modulation. Once the very low-data rate meta-carrier is spread or chipped, the waveform is the spread meta-carrier and represented as $S_{chipped}(t)=B_{chippedI} \cos(\omega_c t+\omega_c)+B_{chippedQ} \sin(\omega_c t+\omega_c)$ 130. The very low-data rate spread meta-carrier is then combined with the original carrier to create a composite carrier 140 also shown in FIG. 1D as $Z_{composite} = X_{orig} S_{chipped}$. Therefore, knowing the energy of the signal to noise density of the original carrier $X_{orig}$ (Es/No) of $X_{orig}$, and knowing that the processing gain Gp of a very low data rate meta-carrier that has been chipped, $S_{chipped}$, is 10 Log(BWRF/DataCarrierID), the result is a signal that has been chipped by many hundreds, thousands, or even millions of times, and the ratio of $X_{orig}$ 100 to $S_{chipped}$ 130 is many times greater than $X_{orig}$ 100. The BWRF bandwidth is the 3 dB or 99% bandwidth of the waveform, and does not utilize the 1% (0.5% on the upper and lower sides of the spectrum) of the transition bandwidth known as "roll-off". For example, assuming a BWRF of 9,600 Hz, and very lower meta-carrier data rate of 20 bits per second, yields a processing gain $G_p$ of 9,600/20=480 or expressed in Decibels (dB) as 10 Log(480)=26.81 dB. As another example, assuming a BWRF of 2,048,000 Hz, and very lower meta-carrier data rate of 20 bits per second, yields a processing gain $G_p$ of 2,048,000/20=102,400 or expressed in Decibels (dB) as 10 Log(102,400)=50.10 dB.

Again, if one assumes the $X_{orig}$ original carrier's Es/No is 26.81 dB, and $S_{chipped}$ has an Ec/No of 5 dB, where Es/No is the symbol energy over the noise density and the Ec/No is the energy of the chipped signal over the noise density, the difference in the original carrier $X_{orig}$ to the spread carrier $S_{chipped}$ is the difference in the realized units of energy as (Ec/No–Es/No): 5 dB –26.81 dB or –21.81 dB. The difference in energy to noise density E/No demonstrates the spread signal of the meta-carrier to the original carrier is a negative quantity and this allows the meta-carrier to have minimum degradation to the original carrier. The example of the BWRF 2,048,000 Hz with an embedded meta-carrier would have a resulting E/No of (Ec/No–Es/No) of 50.10 dB –26.81 dB or 23.29 dB. Keeping the very low-data rate meta-carrier information rate constant allows the original desired carrier, with more bandwidth, to always have higher Es/No properties, resulting in the spread meta-carrier to appear as low-level noise, thus minimally, if at all, degrading the Es/No of the original $X_{orig}$ carrier. As an example, assume $X_{orig}$ 100 is a 2 Msps carrier and the $S_{chipped}$ meta-carrier 130 is a 224 Kcps carrier. $S_{chipped}$ is placed 25 dB (spectral density) or –25 dBc below the $X_{orig}$ 100. Using a spectral factor of 2048 for $S_{chipped}$ 130 this provides 10*Log 10(2048)=33.11 dB of processing gain, which brings the spectral density up from –25 dBc (placement below $X_{chipped}$ 100) to +8.11 dBc (the difference between the realized processing gain of $S_{chipped}$ 130 and the spectral density of $S_{chipped}$ 130). Given that the final output is +8.11 dBc=33.11 dBc–25 dBc, the Co/No is significant enough for the signal to be demodulated.

Figure 3:
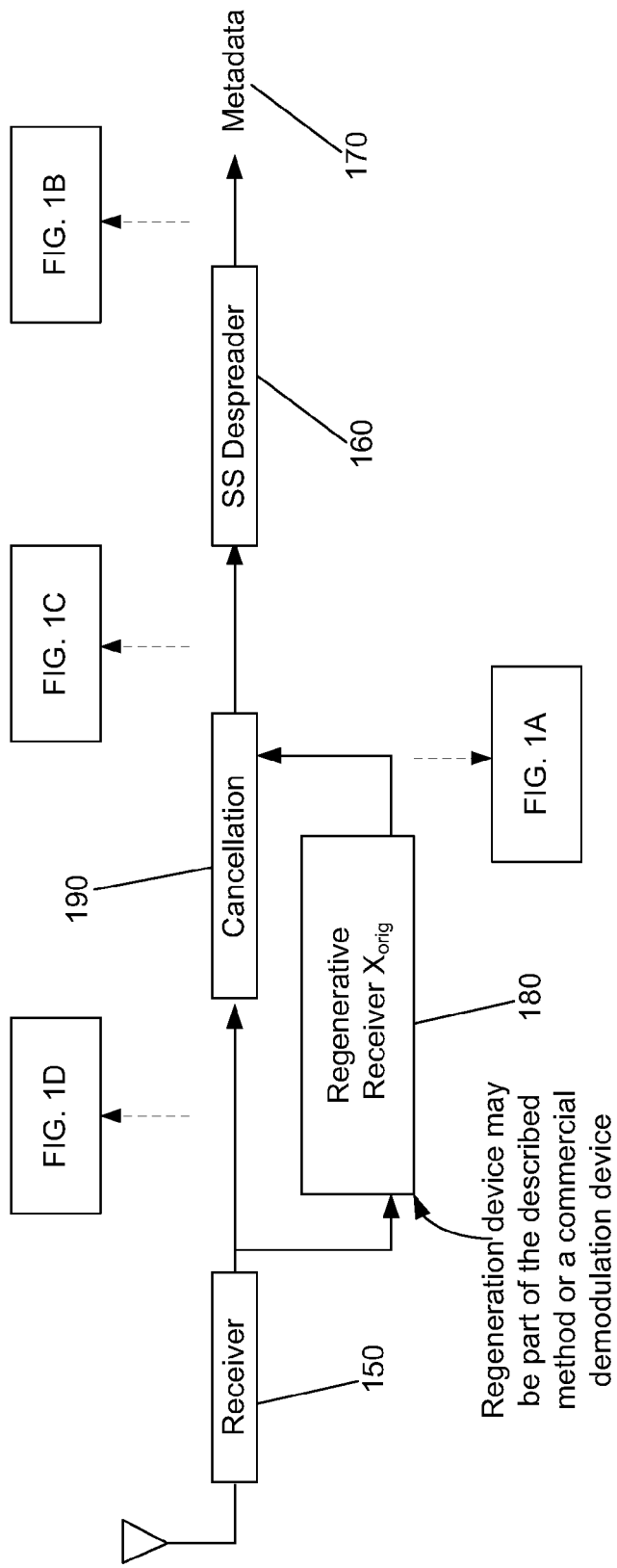
FIG. 3 is a block diagram of a receiving device for demodulating and decoding the meta-carrier with the aid of cancellation.

An implementation of a method for extracting metadata from a meta-carrier at a receiving device 150 is described in FIG. 2. This method may further be combined with cancellation technology 190 by using well known algorithms such as those disclosed in U.S. Pat. No. 6,859,641 to Collins, et. al., the disclosure of which is hereby incorporated herein by reference. Applying cancellation technology to a received waveform as shown in FIG. 3 allows further separation of the composite waveform, thus decreasing the interference due to $X_{orig}$ by suppressing the original carrier prior to attempting to de-spread the meta-carrier waveform, and ultimately increasing the probability the meta-carrier may be demodulated, decoded and extracted for use in determining the identity of the original carrier. One benefit of cancellation may include easier recovery of the spread meta-carrier.

FIG. 2 demonstrates an implementation of a method of receiving the composite carrier as described in FIGS. 1A-1D and directly despreading at a despreader 160, demodulating, and decoding, the meta-carrier, resulting in the output of the metadata 170 that had previously been embedded in the composite carrier signal 140. As shown, the composite carrier signal 140 is received and the original carrier signal and meta-carrier signal are separated based on the realized coding gain, represented as Gp, which equals the ratio of Es/No of the original carrier signal to the Ec/No. This difference provides ample separation between the original desired carrier signal 100 and meta-carrier signal 130, such that the meta-carrier signal 130 may be directly despread, demodulate and decode and the metadata 170 extracted.

FIG. 3 demonstrates an additional implementation of a method that may further enhance the method described in FIGS. 1A-D. In the event the spread meta-carrier signal 130 cannot be despread, demodulated and decoded by the methods described in FIG. 2, the method as described in FIG. 3 may be employed to ensure decodablity of the received composite carrier signal 140. Utilizing methods disclosed in U.S. Pat. No. 6,859,641 to Collins et al., the contents of which were previously incorporated by reference, one may demodulate, decode and remodulate, using regenerative receiver on the original carrier 180, and then utilize cancellation technology on a representation of the original carrier signal to reduce the signal power of the original carrier signal 100. Using the realized processing gain of the spreading for a very low-data 120 rate meta-carrier 130 may provide ample separation between the original carrier 100 and the embedded meta-carrier 130, but in certain critical applications, the method described in FIG. 3 may be brought to bear to further reduce the noise contribution of $X_{orig}$ (Es/No) 100 to near 0 dB, resulting in the final E/No being equal to Ec/No. Therefore, energy from $X_{orig}$ 100 has minimal to no degrading effects on the despread, demodulated and decoded signal for $Y_{Carrier1}$ 120. In this particular implementation, it is critical that the regeneration of $X_{orig}$ 100 is accomplished in a conventional standard manner.

Figure 4:
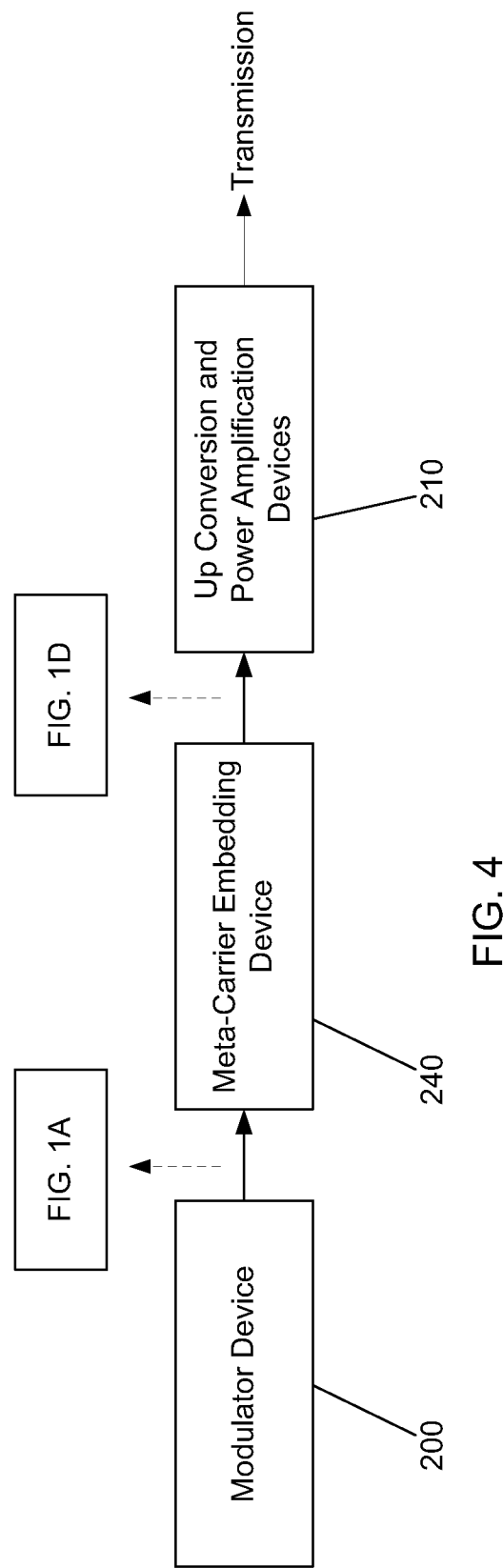
FIG. 4 is a block diagram of an external inline meta-carrier insertion configuration.
Figure 6D:
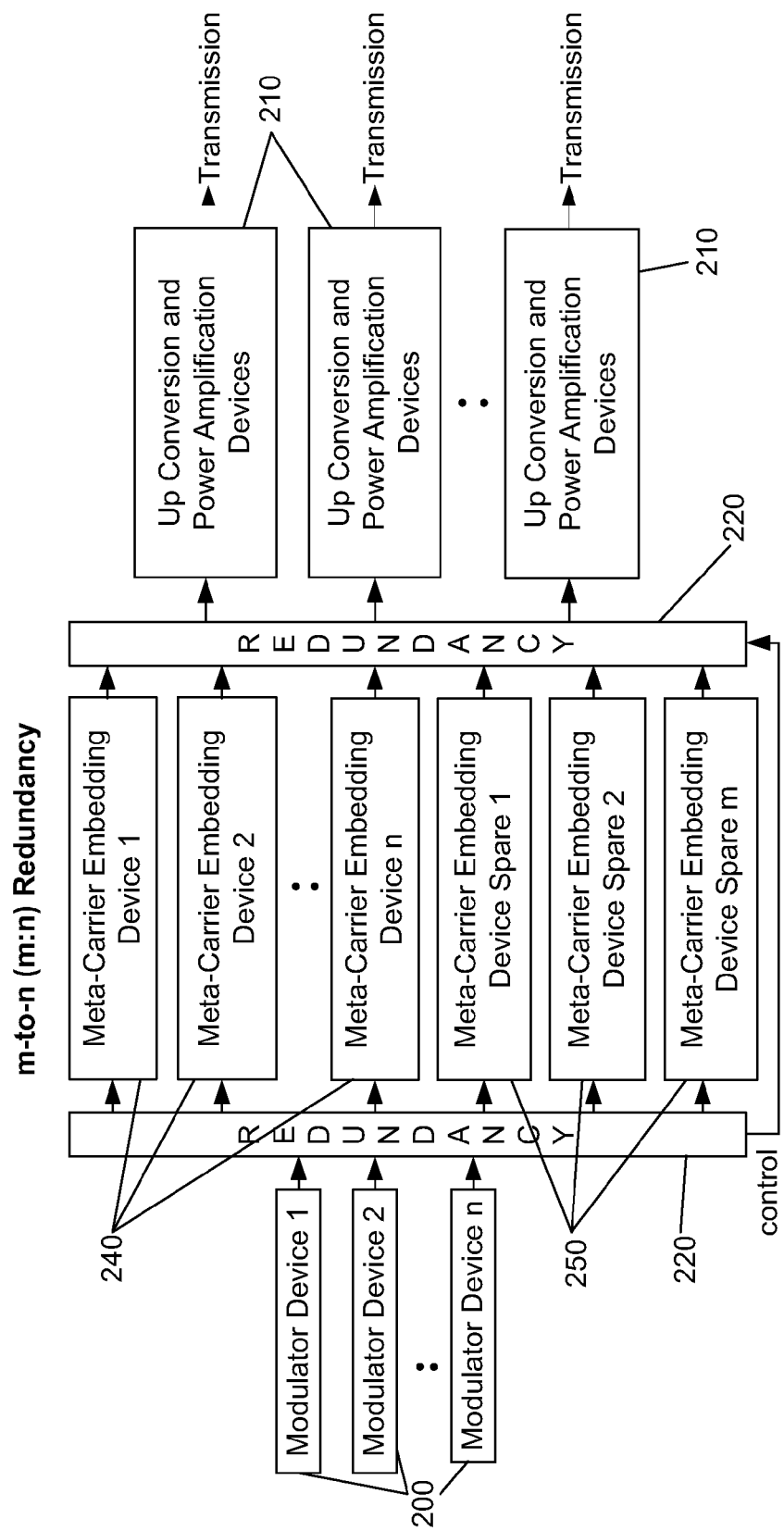

The implementations of the methods described herein for embedding information about the origin and configuration of a carrier may be done in a multitude of ways. While two methods are described in this disclosure as illustrative examples, this disclosure is not limited to these the two implementations. Meta-carrier information may be embedded in a post modulation format, as an ancillary device, in an external manner as shown in FIG. 4. The external or ancillary method is known in the art as being inline and downstream (on the Intermediate Frequency (IF) or Radio Frequency (RF) side) of the modulating device. An alternative approach may be taken to embed the meta-carrier information as part of the modulation process within the modulator device as shown in FIG. 5. This internal method is considered direct embedding of the meta-carrier information and can be at baseband or at IF.

FIG. 4 demonstrates the embedding of the meta-carrier in an "inline" auxiliary unit at the output of a modulated IF or RF carrier. The inline method allows any carrier to be analyzed via a Discrete Fast Fourier Transform (DFFT) using a digital signal processor (DSP) or a field programmable gate array (FPGA) and the center frequency, for example, a 3 dB (99% bandwidth) carrier width may be extracted. The method also provides a mechanism for the user to directly configure the metadata information to be injected into the meta-carrier. Once the waveform's characteristics are obtained, the BWRF may be applied to the waveform and the very low-data rate 120 meta-carrier 130 may be embedded under the original carrier 100 as previously described. The inline method is independent of the type of modulation, symbol rate and carrier power level observed on the input. The resulting meta-carrier 130 will be inserted under the original carrier 100 and may extend to the roll-off points of the original carrier 100, for example, the 3 dB (99% bandwidth). The meta-carrier information to be embedded into the carrier using a meta-carrier embedding device 240 may be provided in a multitude of ways, but is not limited to the methods described. First, the meta-carrier information could be manually entered into the meta-carrier device via human interaction, however, this may introduce the possibility of human error. Second, an automated electronic process, may be accomplished by a computing device, may provide the meta-carrier information directly to the meta-carrier device 240 or via a redundancy unit.

FIG. 5 demonstrates the direct embedding of the meta-carrier 130 as a function of the modulating unit 201 as part of the baseband modulation. The composite meta-data carrier embedding method allows any carrier to have the meta-carrier injected after passing through a filter such as a native pulse shaping Nyquist filter. As previously described, the BWRF may be applied to the waveform and the very low-data 120 rate meta-carrier 130 may be embedded under the original carrier 100 as previously described. The direct insertion method is independent of the type of modulation, symbol rate and carrier power level observed on the input. The resulting meta-carrier may be inserted under the original carrier 100 and may extend to the 3 dB (99% bandwidth) roll-off points of the original carrier 100.

Figure 7D:
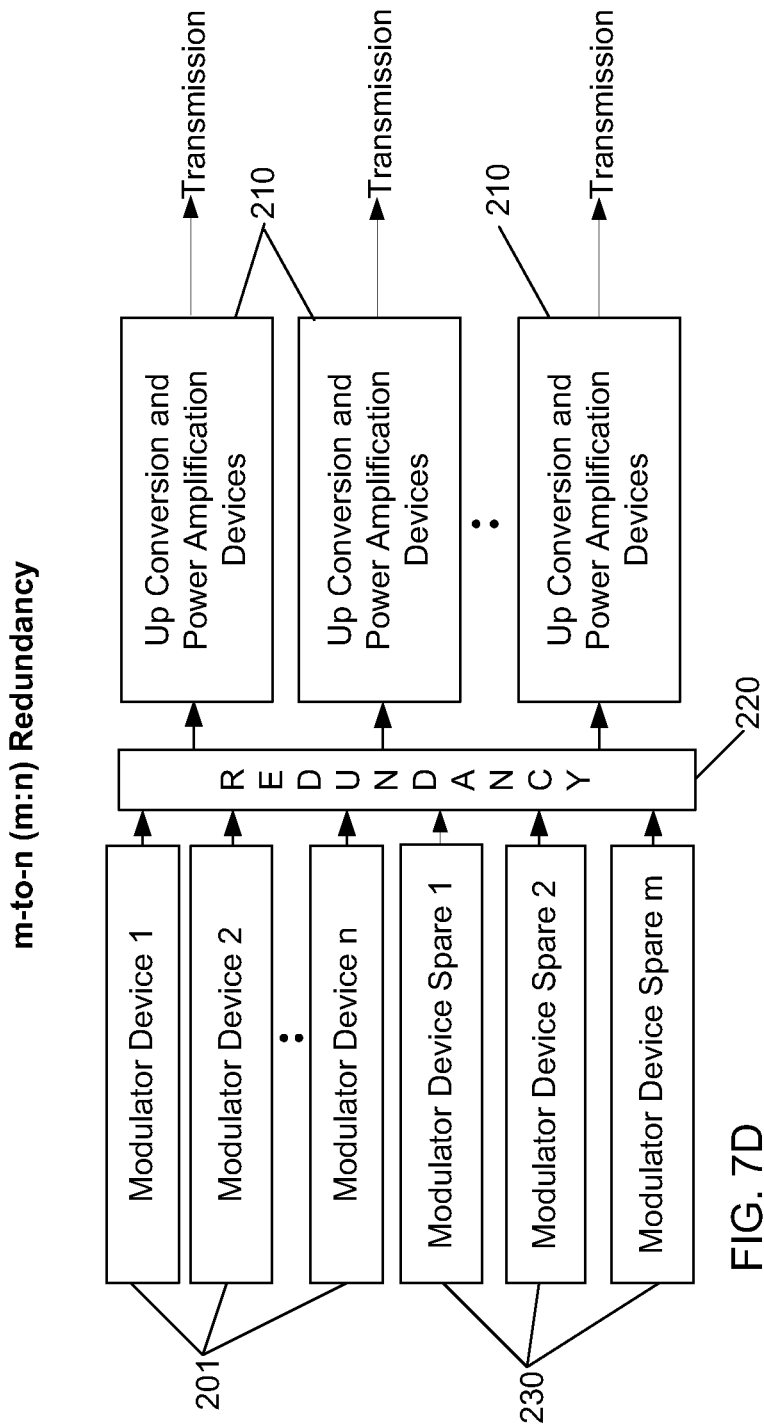

In addition to describing the operation of a method, the configuration provides a provision for supporting a multitude of redundancy configurations for operation. The methods of operation are redundant and non-redundant as illustrated by the examples shown in FIGS. 6A-7D. FIGS. 6-7 demonstrate possible modes of operation, but are not exhaustive in listing all possible combinations.

The meta-data may be provided using multiple embedding devices and/or multiple receiving devices and one or more redundancy controller devices. The redundancy configurations may support 1:1 redundancy, 1:N redundancy or M:N redundancy.

In some implementations, the embedded device may also further comprise a default bypass path to ensure passage of the Original (user) Carrier if the inline embedding device is powered off.

FIGS. 6A-D describe the operation of the described method with consideration to redundancy for the inline embedding of the meta-carrier. No redundancy is considered the most basic form of operation for embedding the meta-carrier. The modulating device 200 outputs the original carrier and the meta-carrier is embedded into the carrier as outlined in FIGS. 1A-D. One-to-one (1:1) redundancy accepts the same output from the modulator which is then passively or actively split and fed to each meta-carrier embedding device 240 inline unit. The concept of one-to-one redundancy provides a provision for a primary and a secondary unit. One-to-one redundancy may accomplished either via an external redundancy device 220 or may be contained into the modulating device 200. One-to-n (1:n) redundancy accepts many inputs that are monitored by an external redundancy controller 220 and passed to a second redundancy controller 220 or an additional portion of the first redundancy controller 220 for routing to the appropriate up conversion and power amplification 210. A single inline meta-carrier embedding unit 250 provides backup to one-to-n online modulating devices 200. M-to-n (m:n) redundancy accepts many inputs that are monitored by an external redundancy controller 220 and passed to a second or part of the first redundancy controller 220, for routing to the appropriate up conversion and power amplification 210. Multiple (m) inline meta-carrier units 250 provide backup to n online meta-carrier embedding devices 240 supporting n modulating devices 200.

FIGS. 7A-D illustrate the operation of the described method with consideration to redundancy for the direct embedding of the meta-carrier. No redundancy is considered the most basic form of operation for embedding the meta-carrier. The modulating device 201 outputs the original carrier 100 and the meta-carrier 130 is embedded into the carrier as outlined in FIGS. 1A-1D. One-to-one (1:1) redundancy accepts the same output from the modulating device 201 and passes each output to an external redundancy device 220. The concept of one-to-one provides a provision for a primary and a secondary unit. One-to-one redundancy may be accomplished either via an external redundancy device 220 or be contained into the modulating device 201. One-to-n (1:n) redundancy accepts many inputs that are monitored by an external redundancy controller 220 for the appropriate routing to the up conversion and power amplification 210. A single modulating device 230 provides backup to one-to-n online modulating devices 201. M-to-n (m:n) redundancy accepts many inputs that are monitored by an external redundancy controller 220 for routing to the appropriate up conversion and power amplification 210. Multiple (m) modulating device units 230 provide backup to n online modulating devices 201.

The following provides descriptions of non-limiting examples of implementations of embedded meta-carrier techniques:

Example 1

A satellite earth station may be configured to operate at an assigned center frequency, symbol rate and polarization to transmit to a satellite at a geo-equatorial location, polarization and frequency. In this example, the earth station is not pointed to the proper satellite when it begins transmission. This results in the wrong satellite being illuminated. In the event the improperly radiated satellite has the frequency assigned for use which is not for this carrier, the result is an outage due to energy being injected into the satellite's transponder that is then re-transmitted along with the proper carrier to receiving devices. The methods described in the disclosure above may allow one to detect, resolve and process the interfering carrier's meta-carrier, thus providing information about the improperly configured carrier.

Example 2

In particular implementations of the system described in Example 1, a carrier may be uplinked to as part of an ad-hoc service, and the service is only required for a short duration. As an aid to the link provider, the transmission with a meta-carrier may be used as confirmation of the transmission's origin and may be set up so as to be confirmed by a remote receiving station.

Example 3

In particular implementations of the system described in Example 1, a satellite earth station is configured to operate a carrier at an assigned center frequency, symbol rate and polarization to a satellite at a particular frequency and geo-equatorial location. For this example if the earth station is pointed to the proper satellite but has an incorrect carrier center frequency and begins transmission this results in the wrong frequency of a satellite transponder being illuminated. In this event, the improperly radiated satellite transponder does not have the frequency assigned for use. The result is a spurious carrier whose source is difficult to identify. The methods described in the above disclosure may allow one to detect, resolve and process the interfering carrier's meta-carrier, thus providing information about the improperly configured carrier.

Example 4

In particular implementations of the system described in Example 1, a satellite earth station is configured to operate a carrier at an assigned center frequency, symbol rate and polarization to a satellite at a particular frequency and geo-equatorial location. For this example, if the earth station is pointed to the proper satellite, and has a correct carrier center frequency but the wrong symbol rate in excess of the assigned symbol rate and begins transmission, this results in the satellite transponder being illuminated with a carrier that crosses over into an adjacent channel. In this event, the improperly radiated satellite transponder has multiple carriers using the same frequency. The result is a potential outage of both adjacent carriers due to energy being injected into the satellite's transponder that is then re-transmitted along with the adjacent carrier. The methods described in the above disclosure may allow one to detect, resolve and process the interfering carrier's meta-carrier, thus providing information about the improperly configured carrier.

Example 5

In particular implementations of the system described in Example 1 a satellite earth station is configured to transmit a carrier signal at an assigned center frequency, symbol rate and polarization to a satellite at a particular frequency and geo-equatorial location. For this example, if the earth station is pointed to the proper satellite, has a correct carrier center frequency, but an incorrect polarization, and begins transmission, this results in the wrong frequency of a satellite transponder being illuminated. In this event, the improperly radiated satellite transponder has the frequency assigned for use, but not for this carrier. The results are an outage due to energy being injected into the satellite's transponder that is then re-transmitted along with the proper carrier. The methods described in the above disclosure may allow one to determine the interfering carrier's meta-carrier, thus providing information about the improperly configured carrier.

Example 6

In particular implementations of the system described in Example 1, a satellite earth station is configured to operate a carrier at an assigned center frequency, symbol rate and polarization to a satellite at a particular frequency and geo-equatorial location. For this example, if the earth station is pointed to the proper satellite, has a correct carrier center frequency, but an incorrect polarization, and begins transmission, this results in the wrong frequency of a satellite transponder being illuminated. In this event, the improperly radiated satellite transponder does not have the frequency assigned for use. The result is a spurious carrier whose source is difficult to identify. The methods described in the above disclosure may allow one to determine the interfering carrier's meta-carrier, thus providing information about the improperly configured carrier.

Example 7

In particular implementations of system described in Example 1, a low symbol rate, low power carrier is transmitted over a satellite link. The resulting separation of Es/No to Ec/No does not provide ample separation for dispreading the received waveform. Through use of the method described in FIG. 3, $X_{orig}$ is further reduced by cancellation, resulting in the desired $S_{chipped}$ being decoded and the original $Y_{CarrierI}$ being demodulated and decoded.

Example 8

A space-based satellite relay is configured to receive earth-based carriers and relay the carriers back to the earth. The carrier(s) may be received, combined, amplified and combined with a low-rate data meta-carrier containing, but not limited to, information regarding the satellite's assigned orbital location, current ephemeris information, owner, transponder identification, operating frequency, etc. The very low-data rate meta-carrier is embedded over the entire or partial passband of the relay's passband. For a satellite system, the very low-data rate meta-carrier may be embedded into one or many transponders.

Example 9

An airborne relay is configured to receive earth-based carriers and relay the carriers back to the earth. The carrier(s) may be received, combined, amplified and combined with a low-rate data meta-carrier containing, but not limited to, information regarding the airborne relay's assigned location, owner, transponder identification, operating frequency, etc. For an airborne system, the bandwidth may be spread over one or many transponders.

Example 10

A terrestrial relay is configured to receive terrestrial or airborne carriers and relay the carriers to the same or different geographic location(s). The carrier(s) may be received, combined, amplified and combined with a low-rate data meta-carrier containing, but not limited to, information regarding the relay's assigned location, owner, operating frequency, etc. For a terrestrial relay system, the bandwidth may be spread over one or multiple frequency allocations.

In places where the description above refers to particular implementations of to telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A communication method for embedding a meta-carrier signal under an original carrier signal, the method comprising:
embedding information to identify a transmission source of at least one of an original carrier signal and an interfering carrier signal by forming a composite carrier comprising a meta-carrier signal combined with the at least one of the original carrier signal and the interfering carrier signal, the composite carrier being formed after the meta-carrier signal is modulated as the meta-carrier signal and after the at least one of the original carrier signal and the interfering carrier signal is modulated as its respective carrier signal separate from the meta-carrier signal, the meta-carrier signal comprising information to identify the transmission source of the at least one of the original carrier signal and the interfering carrier signal with which it is transmitted as the composite carrier;

transmitting the composite carrier to a receiver;

wherein the meta-carrier signal is extractable at the receiver under an interfered condition without demodulating the original carrier signal or the interfering carrier signal, the interfered condition caused by interference between the original carrier signal and the interfering carrier signal, wherein the meta-carrier signal is transmitted such that the meta-carrier signal occupies at least a portion of a bandwidth of the respective at least one of the original carrier signal and the interfering carrier signal whose transmission source the meta-carrier signal identifies.

2. The method of claim 1, wherein the original carrier signal comprises information as to the identity of the original carrier signal.

3. The method of claim 1, wherein the original carrier signal is without information as to an identity of the original carrier signal.

4. The method of claim 3, wherein the modulation format is one of binary phase shift keying (BPSK), differential BPSK, phase shift keying (PSK), quadrature amplitude modulation (QAM) and M-ary modulation.

5. The method of claim 1, further comprising:
encoding meta-data that contains information about the original carrier signal using an encoder;
modulating the encoded meta-data using a modulator;
spreading, using a spreader, the modulated meta-data such that a spread meta-carrier signal results; and
combining, by a meta-carrier embedding device, the spread meta-carrier signal with the original carrier signal to create a composite carrier signal such that the spread meta-carrier signal occupies at least a portion of a bandwidth of the original carrier signal.

6. The method of claim 5, further comprising:
receiving the composite carrier signal by a receiving device;
despreading, using a despreader, the spread meta-carrier signal;
demodulating, using a demodulator, the despread meta-carrier signal; and
decoding, using a decoder, the demodulated meta-data signal.

7. The method of claim 6, further comprising scanning, by a scanning device, a spectrum of the received composite carrier signal to automatically detect the meta-carrier signal.

8. The method of claim 5, further comprising:
remodulating, using a regenerative receiver on the original carrier, a representation of the original carrier; and
reducing signal power of the original carrier signal contained in the composite carrier signal using cancellation prior to despreading the spread meta-carrier signal.

9. The method of claim 5, wherein a realized processing gain is the ratio of the bandwidth of the spread meta-carrier signal to the bandwidth of the meta-carrier signal prior to spreading.

10. The method of claim 5, wherein the combining further comprises externally embedding the spread meta-carrier signal containing the meta-data within the original carrier signal downstream of the modulator.

11. The method of claim 10, wherein the external embedding further comprises embedding at least one spread meta-carrier signal within more than one of a plurality of original carrier signals.

12. The method of claim 10, further comprising:
combining, by an embedding device, the original carrier signal and the spread meta-carrier signal;
embedding the spread meta-carrier signal into the original carrier signal using an embedding device such that the composite carrier signal results; and
creating a redundancy of the composite carrier signal using a redundancy controller.

13. The method of claim 12, wherein the redundancy is a one-to one redundancy.

14. The method of claim 10, further comprising:
receiving by a redundancy controller two or more output signals from two or more modulators; and
embedding, by one or more meta-carrier embedding devices, the post-modulation meta-carrier signal within the original carrier signal.

15. The method of claim 14, wherein the redundancy controller provides a one-to-n redundancy where n equals the number of modulating devices providing output signals that are monitored by the redundancy controller.

16. The method of claim 14, wherein the redundancy controller provides an m-to-n redundancy where n equals the number of modulating devices providing output signals that are monitored by the redundancy controller and m equals the number of spare meta-carrier embedding devices that provide backup to n modulating devices.

17. The method of claim 5, wherein the combining further comprises directly embedding the meta-carrier signal containing meta-data during the modulation process within a modulator.

18. The method of claim 17, further comprising:
accepting one or more composite carrier output signals from two or more modulating devices, the composite carrier output signals by the two or more modulating devices; and
transmitting each output signal to a redundancy controller.

19. The method of claim 18, wherein the redundancy controller provides a one-to-one redundancy.

20. The method of claim 18, wherein the redundancy controller provides a one-to-n redundancy by monitoring the output signals of n modulating devices and a spare backup modulating device where n equals the number of modulating devices providing output signals that are monitored by the redundancy controller.

21. The method of claim 18, wherein the redundancy controller provides an m-to-n redundancy where n equals the number of modulating devices providing output signals that are monitored by the redundancy controller and m equals the number of spare modulating devices that provide backup to n modulating devices.

22. The method of claim 5, further comprising:
analyzing the composite carrier signal; and
extracting a carrier center frequency and carrier bandwidth.

23. The method of claim 22, further comprising:
applying an $n^{th}$ order non-linearity to the original carrier signal prior to analyzing the original carrier signal.

24. A communication system for embedding a meta-carrier signal under an original carrier signal comprising:
an encoder that encodes meta-data containing information about an original carrier signal;

a spreader that receives the encoded meta-data from the encoder, spreads the encoded meta-data such that a spread meta-carrier signal results;

a modulator that modulates a spread meta-carrier signal using a modulation format;

a meta-carrier embedding device that receives the modulated spread meta-carrier signal, combines the modulated spread meta-carrier signal with a modulated original carrier signal to create a composite carrier signal;

at least one transmitting device that transmits the composite carrier signal comprising the modulated original carrier signal and the modulated meta-carrier signal from a transmission source to a receiver, the meta-carrier signal being modulated as the meta-carrier signal separate from the modulated original carrier signal, comprising information to identify the transmission source, and being extractable from the composite carrier at the receiver without demodulating the original carrier signal under an interfered condition caused by interference between the composite carrier and an interfering signal;

wherein the meta-carrier signal occupies at least a portion of a bandwidth of the original carrier signal.

25. The system of claim 24, wherein the original carrier signal further comprises information as to the identity of the original carrier signal.

26. The system of claim 24, wherein the original carrier signal is without information as to the identity of the original carrier signal.

27. The system of claim 24, further comprising:
a receiving device that receives the composite carrier signal from the transmitting device and routes the composite carrier signal;
a despreader that receives the spread meta-carrier signal and extracts the meta data by despreading the spread meta-carrier signal;
a demodulator that receives the de-spread meta-carrier signal from the separating device, demodulates the de-spread meta-carrier signal, and routes demodulated meta-carrier signal; and
a decoder that receives the demodulated meta-carrier signal from the demodulator and decodes the demodulated meta-data signal.

28. The system of claim 27, further comprising a scanning device that scans a spectrum of the received composite carrier signal to automatically detect the meta-carrier signal.

29. The system of claim 24, further comprising:
a regenerative receiver that remodulates a representation of the original carrier signal; and
a cancellation device that reduces signal power of the original carrier signal contained in the composite carrier signal prior to dispreading the spread meta-carrier signal.

30. The system of claim 24, wherein a realized processing gain is the ratio of the bandwidth of the spread meta-carrier signal to the bandwidth of a meta-carrier signal prior to spreading.

31. The system of claim 24, wherein the modulator directly embeds the carrier signal containing meta-data into the original carrier signal during the modulation process.

32. The system of claim 31, further comprising a redundancy controller that accepts one or more composite carrier output signals from two or more modulating devices, the composite carrier output signals comprising one or more spread meta-carrier signals embedded within one or more original carrier signals by the two or more modulating devices wherein the redundancy controller further routes the output signals to one or more devices for up conversion and power amplification.

33. The system of claim 32, wherein the redundancy controller provides a one-to one redundancy.

34. The system of claim 32, wherein the redundancy controller provides a one-to-n redundancy by monitoring the output signals of n modulating devices and a spare backup modulating device where n equals the number of modulating devices providing output signals that are monitored by the redundancy controller.

35. The system of claim 32, wherein the redundancy controller provides an m-to-n redundancy where n equals the number of modulating devices providing output signals that are monitored by the redundancy controller and m equals the number of spare modulating devices that provide backup to n modulating devices.

36. The system of claim 24, further comprising a digital signal processor that analyzes the composite carrier signal and extracts a carrier center frequency and carrier bandwidth.

37. The system of claim 36, further comprising:
an $n^{th}$ order linearity that is applied to the original carrier signal prior to analyzing the original carrier signal.

38. The system of claim 24, further comprising a redundancy controller that provides the meta-data to the modulator.

39. The system of claim 24, wherein the meta-carrier embedding device combines the spread meta-carrier signal with the original carrier signal downstream of the modulator.

40. The system of claim 39, wherein the meta-carrier embedding device further embeds at least one spread meta-carrier signal within more than one of a plurality of original carrier signals.

41. The system of claim 39, further comprising:
an embedding device that receives the original carrier signal and the spread meta-carrier signal and embeds the spread meta-carrier signal into the original carrier signal such that the composite carrier signal results; and
a redundancy controller that creates a redundancy of the composite carrier.

42. The system of claim 41, wherein the redundancy is a one-to one redundancy.

43. The system of claim 39, further comprising:
a redundancy controller that receives two or more output signals from two or more modulators; and
one or more meta-carrier embedding devices that receive the output signals from the redundancy controller and embed the post-modulation meta-carrier signal within the original carrier signal.

44. The system of claim 43, wherein the redundancy controller provides a one-to-n redundancy where n equals the number of modulating devices providing output signals that are monitored by the redundancy controller.

45. The system of claim 43, wherein the redundancy controller provides an m-to-n redundancy where n equals the number of modulating devices providing output signals that are monitored by the redundancy controller and m equals the number of spare meta-carrier embedding devices that provide backup to n modulating devices.

46. The system of claim 24, wherein the modulation format is one of binary phase shift keying (BPSK), differential BPSK, phase shift keying (PSK), quadrature amplitude modulation (QAM), and M-ary modulation.

* * * * *